United States Patent
Breedvelt-Schouten et al.

(10) Patent No.: US 9,568,746 B1
(45) Date of Patent: Feb. 14, 2017

(54) RESPONSIVE NOSE PAD SIGNALING MECHANISM

(71) Applicant: International Business Machines Corporation, Armonk, NY (US)

(72) Inventors: Ilse M. Breedvelt-Schouten, Manotick (CA); Jana H. Jenkins, Raleigh, NC (US); Jeffrey A. Kusnitz, Campbell, CA (US); John A. Lyons, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/930,878

(22) Filed: Nov. 3, 2015

(51) Int. Cl.
G02C 1/00 (2006.01)
G02C 11/00 (2006.01)
G02C 5/12 (2006.01)
G08B 6/00 (2006.01)
G02C 11/04 (2006.01)

(52) U.S. Cl.
CPC ............... *G02C 11/10* (2013.01); *G02C 5/12* (2013.01); *G02C 11/04* (2013.01); *G08B 6/00* (2013.01)

(58) Field of Classification Search
CPC ............ G02C 5/12; G02C 11/04; G02C 11/10
USPC .................................................. 351/136, 158
See application file for complete search history.

(56) References Cited

U.S. PATENT DOCUMENTS

| | | | |
|---|---|---|---|
| 7,922,321 B2 | 4/2011 | Howell et al. | |
| 8,303,110 B1 | 11/2012 | Weaver et al. | |
| 8,384,617 B2 | 2/2013 | Braun et al. | |
| 8,766,765 B2 | 7/2014 | Hamadallah | |
| 2010/0198506 A1 | 8/2010 | Neilhouse | |
| 2013/0141313 A1 | 6/2013 | Zhou et al. | |
| 2016/0132107 A1* | 5/2016 | Kanishima | G06F 3/013 345/633 |

FOREIGN PATENT DOCUMENTS

WO  WO97/17043  5/1997

* cited by examiner

Primary Examiner — Huy K Mai
(74) Attorney, Agent, or Firm — Francis Lammes; Stephen J. Walder, Jr.; Ryan Lewis

(57) ABSTRACT

A set of responsive nose pad mechanisms is provided for notifying a user of an alert using one or more responsive nose pads coupled to a set of eyeglasses the user is wearing. Responsive to receiving a signal from a mobile device, each responsive nose pad signaling mechanism in the set of responsive nose pad mechanisms determines whether the signal is intended for the responsive nose pad signaling mechanism. Responsive to the signal being intended for the responsive nose pad signaling mechanism, the responsive nose pad signaling mechanism identifies one or more alerts to be implemented. The responsive nose pad mechanism then implements the one or more alerts such that the alert is generated by one or more devices within the associated responsive nose pad.

20 Claims, 7 Drawing Sheets

RESPONSIVE NOSE PAD SIGNALING MECHANISM

BACKGROUND

The present application relates generally to an improved data processing apparatus and method and more specifically to mechanisms for a responsive nose pad signaling mechanism.

Currently, mobile devices provide indications of an incoming call, text message, or email to a user by playing a ringtone or through a vibrating alert. That is, a ringtone is the sound produced by a mobile device to indicate an incoming call, text message, or email, that is not literally a tone but is most often used today to refer to customizable sounds used on mobile devices. A vibrating alert is an alternate or supplementary feature of mobile device to notify the user of an incoming call, text message, or email. Vibrating alerts are primarily used when a user cannot hear the ring tone (a noisy environment or through hearing loss) or wants a more discreet notification. However, when the mobile device is placed on a hard surface, the vibrating alert can often be as loud or louder than a ringtone.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method in a set of responsive nose pad mechanisms each comprising a processor and a memory coupled to the processor, is provided for notifying a user of an alert using one or more responsive nose pads coupled to a set of eyeglasses the user is wearing. The illustrative embodiment determines whether the signal is intended for the responsive nose pad signaling mechanism by each of the set of responsive nose pad mechanisms in response to receiving a signal from a mobile device. The illustrative embodiment identifies, by the responsive nose pad signaling mechanism, one or more alerts to be implemented in response to the signal being intended for the responsive nose pad signaling mechanism. The illustrative embodiment implements, by the responsive nose pad mechanism, the one or more alerts such that the alert is generated by one or more devices within the associated responsive nose pad.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
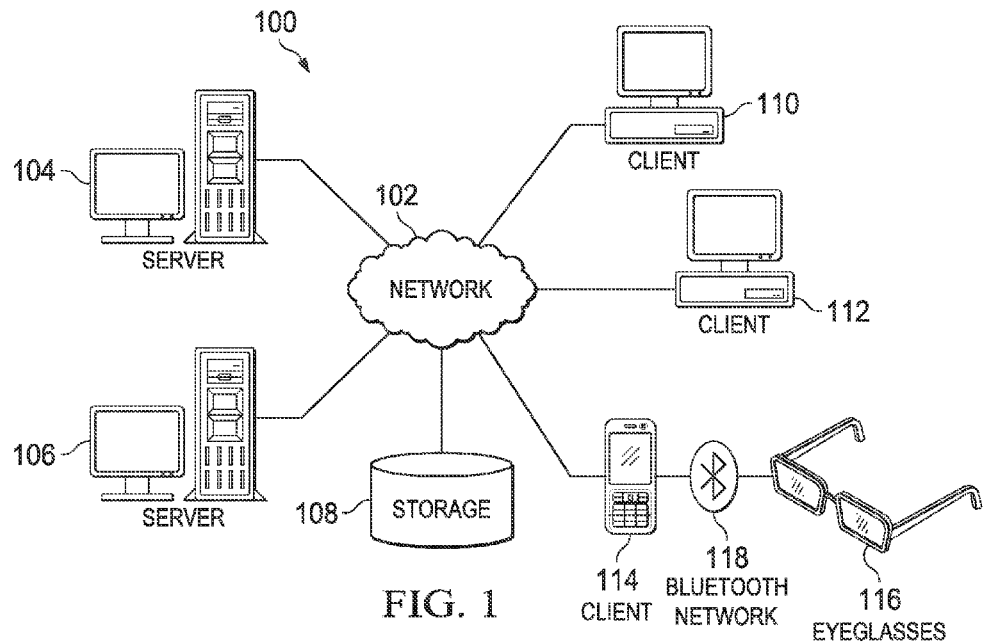
FIG. 1 is an example diagram of a distributed data processing system in which aspects of the illustrative embodiments may be implemented.

Again, mobile devices provide indications of an incoming call, text message, or email to a user by playing a ringtone or through a vibrating alert. However, there are situations that a user may be in where a ringtone may not be heard and the vibrating alert may not be felt by the user. For example, if the user is walking in a crowded shopping area and their mobile device is in their purse or backpack the user may not hear the ringtone or feel the vibrating alert from the mobile device indicating the incoming call, text message, or email. As another example, during the winter season, a user may be wearing a winter coat, hat, gloves, or the like. If the user's winter coat is well insulated and the user's mobile device is in a pocket of the winter coat, the user again, may not hear the ringtone or feel the vibrating alert from the mobile device indicating the incoming call, text message, or email.

This, the illustrative embodiments provide mechanisms to alert a user to an incoming call, text message, or email, as well as provide other cues from a mobile device to a user through responsive nose pads on a set of eyeglasses that the user is wearing. That is, when a user is in a situation where a ringtone may not be heard or a vibrating alert may not be felt by the user, the responsive nose pad signaling mechanism of the illustrative embodiments utilize nose pads on the user's eyeglasses as an output device to provide cues to the user. The cues may include vibration alerts, visual alerts, or the like, to notify the user of, for example, an incoming call, text message, or email, directions to their location, health alerts, or the like. For example, a user may be notified of an incoming call, text message, or email by the mobile device sending a signal to the nose pads on the user eyeglasses that causes the nose pads to vibrate on the user's nose or flash a light onto the lens of the eyeglasses that reflects toward the user such that the light is detectable by the user. As another example, a user who is traveling to a desired location, may be provided with directions by a direction application on the mobile device providing right or left turn indications to the user through by the mobile device sending a signal to either the right nose pad or left nose pad on the user eyeglasses. These indications may cause either the right nose pad or left nose pad to vibrate on the user's nose or flash a light onto the lens of the eyeglasses that reflects toward the user such that the light is detectable by the user informing the user to turn right or left. Thus, the responsive nose pads of the illustrative embodiments, provide a symmetrically placed (left-right) output device for users. Therefore, when a user wears eyeglasses equipped with the responsive nose pads, the user may be notified of incoming calls, text messages, emails, or other alerts that may otherwise be missed when the user is otherwise unable to hear a ringtone or feel an vibrating alert.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
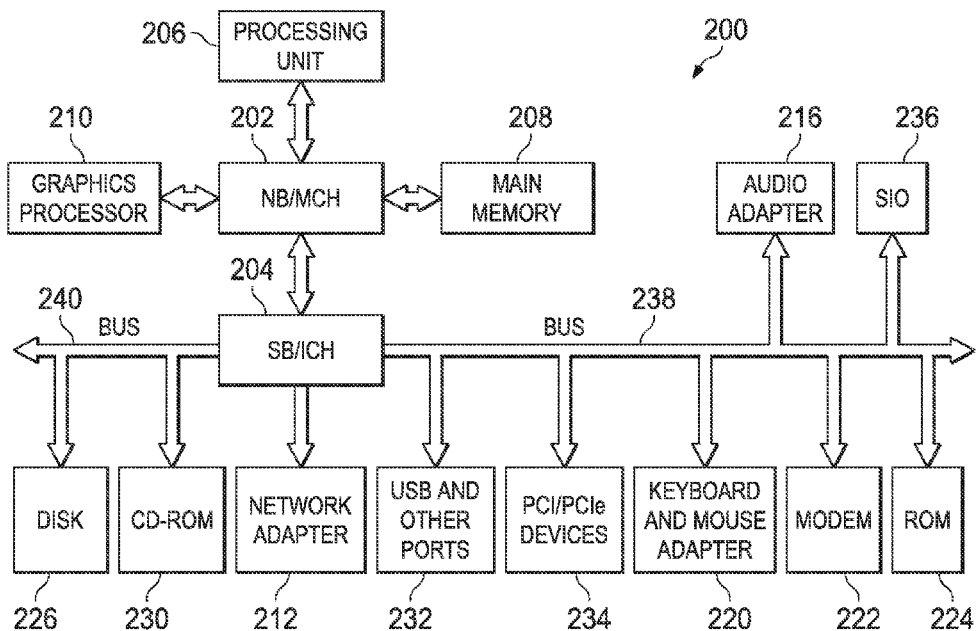
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, mobile devices, or the like. In the depicted example, server 104 provides data, such as boot files, operating system images, and applications to the clients 110, 112, and 114. Clients 110, 112, and 114 are clients to server 104 in the depicted example. Clients 110, 112, and 114 may further be coupled to other devices, such as client 114 being coupled to eyeglasses 116 via Bluetooth network 118. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., client 114 in conjunction with eyeglasses 116, may be specifically configured to implement a responsive nose pad signaling mechanism. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates notifications being sent to a user though a responsive nose pad signaling mechanism.

As noted above, the mechanisms of the illustrative embodiments utilize specifically configured computing devices, or data processing systems, to perform the operations for signaling a user through responsive nose pads. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServe™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the a responsive nose pad signaling mechanism.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
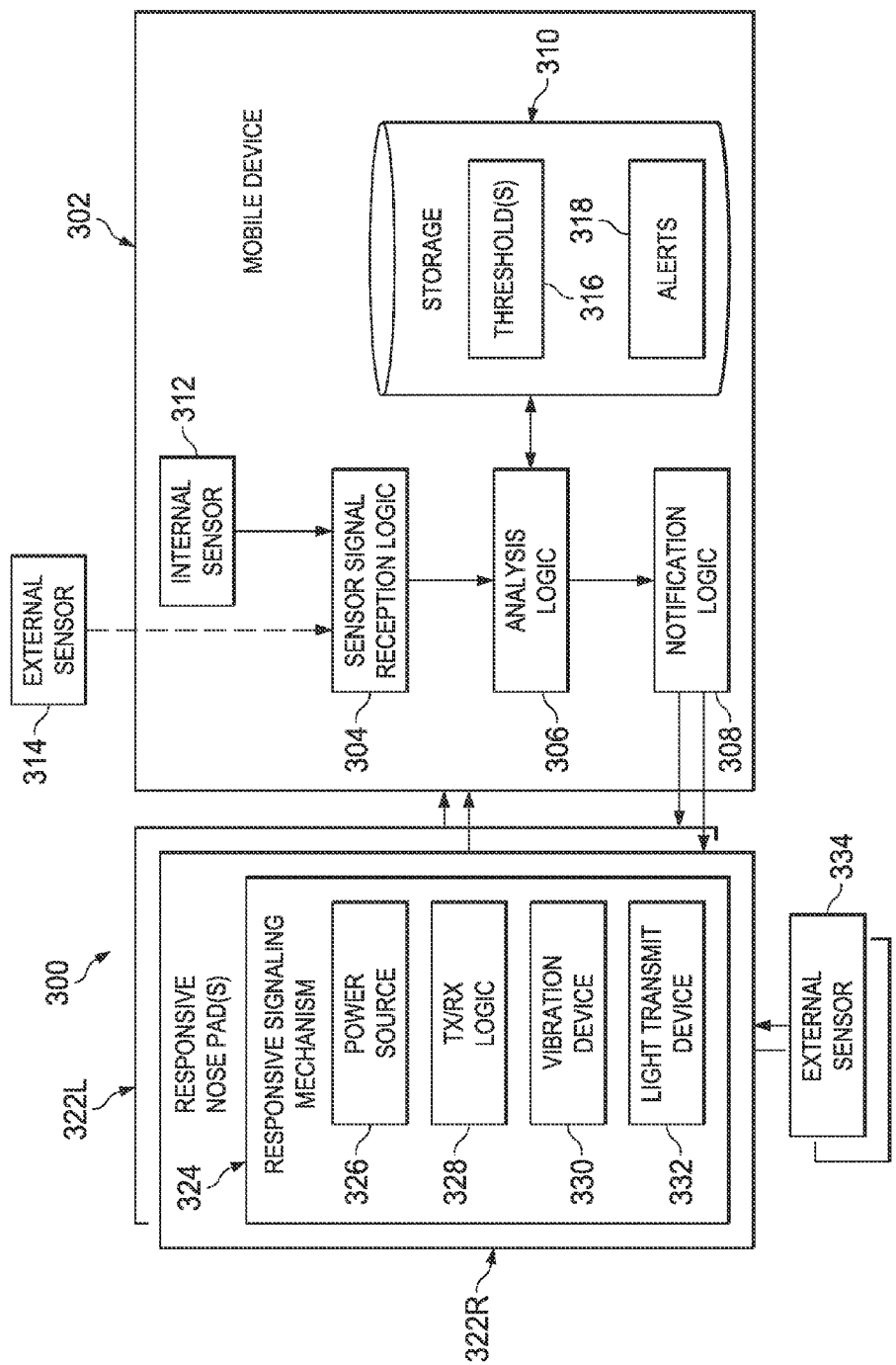
FIG. 3 depicts a functional block diagram of a responsive nose pad signaling mechanism in accordance with an illustrative embodiment.

FIG. 3 depicts a functional block diagram of a responsive nose pad signaling mechanism in accordance with an illustrative embodiment. Data processing system 300 comprises mobile device 302, right responsive nose pad 322R, and left responsive to nose pad 322L. Mobile device 302, right responsive nose pad 322R, and left responsive to nose pad 322L are in themselves data processing systems such as data processing system 200 of FIG. 2. Furthermore, mobile device 302 comprises sensor signal reception logic 304, analysis logic 306, notification logic 308, and storage 310. Additionally, within each of right responsive nose pad 322R and left responsive to nose pad 322L is a responsive signaling mechanism 324 that comprises power source 326, transmit (Tx)/receive (Rx) logic 328, vibration device 330, and light transmit device 332. In operation, sensor signal reception logic 304 receives a signal directly from one or more of internal sensor 312 or external sensor 314 or indirectly from external sensor 334 via right responsive nose pad 322R and/or left responsive to nose pad 322L. For example, internal sensor 312 may provide a signal to sensor signal reception logic 304 when, for example, a call, email, text message, or the like, is coming into mobile device 302, or when global position system directions are identified. With regard to external sensor 314, which may be a heart rate monitor, insulin monitor, or other health related monitor, external sensor 314 may provide a signal to sensor signal reception logic 304 when, for example, the user's heart rate rises above a predetermined threshold or a user's insulin drops below a predetermined threshold. With regard to external sensor 334, which may be a seizure monitor, battery failure indicator, or the like, external sensor 334 may provide a signal to sensor signal reception logic 304 via Tx/Rx logic 328 when, for example, the user enters a seizure event and the user's eyes being to blink rapidly, when a user's hearing aid battery begins to fail, or the like.

When sensor signal reception logic 304 receives such a signal, sensor signal reception logic 304 sends the signal to analysis logic 306 which compares the signal to one or more predetermined thresholds 316 in storage 310. For example, when a heart rate signal is received, analysis logic 306 may compare the heart rate signal to a predetermined threshold and, if the user's heart rate is above the predetermined threshold, then analysis logic 306 sends a signal to notification logic 308 so that notification logic 308 can instruct one or more of right responsive nose pad 322R and/or left responsive to nose pad 322L to perform a function. Based on the received signal and the predetermined threshold that has been exceeded, notification logic 308 determines which alert from a set of alerts 318 to send to one or more of right responsive nose pad 322R and/or left responsive to nose pad 322L. The alerts in the set of alerts 318 may comprise one or more of executing a vibration of the nose pad(s), initiating a predetermined light pattern, or a combination of executing a vibration of the nose pad(s) and initiating a predetermined light pattern. Each predetermined threshold may have a set alert to be initiated when the threshold is exceeded.

While the above example utilizes thresholds to send instruction to one or more of right responsive nose pad 322R and/or left responsive to nose pad 322L, other types of signals may be sent that do not require threshold to be exceeded. For example, if a user is traveling to a desired location, a direction application on mobile device 302 may send a signal to sensor signal reception logic 304 indicating that the user should turn right or left. Sensor signal reception logic 304 recognizes that the signal is a direction signal and passes the signal to notification logic 308 via analysis logic 306. Notification logic 308 then sends the direction signal to one or more of right responsive nose pad 322R and/or left responsive to nose pad 322L which would cause the appropriate nose pad to execute a vibration, initiate a predetermined light pattern, or a combination of executing a vibration of the nose pad and initiating a predetermined light pattern indicating that a right or left turn should be made. For example, if a direction application indicates that a right turn should be made, then, after receiving the right turn signal, notification logic 308 would directly pass the right turn signal to the right responsive nose pad 322R so that the right responsive nose pad 322R would either execute a vibration, initiate a predetermined light pattern, or a combination of executing a vibration of the nose pad and initiating a predetermined light pattern. Finally, once the user arrives at the desired location, the direction application may send a signal to sensor signal reception logic 304 indicating the arrival at the final destination, which sensor signal reception logic 304 passes the signal to notification logic 308 via analysis logic 306. Notification logic 308 then sends a signal to both right responsive nose pad 322R and left responsive to nose pad 322L causing both right responsive nose pad 322R and/or left responsive to nose pad 322L to execute a vibration, initiate a predetermined light pattern, or a combination of executing a vibration of the nose pad and initiating a predetermined light pattern indicating the desired location has been reached.

While small in size, right responsive nose pad 322R and left responsive nose pad 322L comprise a power source 326 that provides enough power for Tx/Rx logic 328 to receive signals provided from external sensor 334 and transmit the signal to sensor signal reception logic 304 as well as receive signals from notification logic 308 via a Bluetooth network, such as Bluetooth network 118 of FIG. 1. Responsive to receiving a signal from notification logic 308 via the Bluetooth network and as will be illustrated in FIG. 4-6, Tx/Rx logic 328 analyzes the signal and sends it to the appropriate one(s) of vibration device 330 and/or light transmit device 332 so that the appropriate alert is executed. That is, based on the signal received from notification logic 308, the receiving one(s) of Tx/Rx logic 328 may cause right responsive nose pad 322R and/or left responsive to nose pad 322L to execute a vibration of the nose pad, initiate a predetermined light pattern, or a combination of executing a vibration of the nose pad and initiating a predetermined light pattern.

Figure 4:
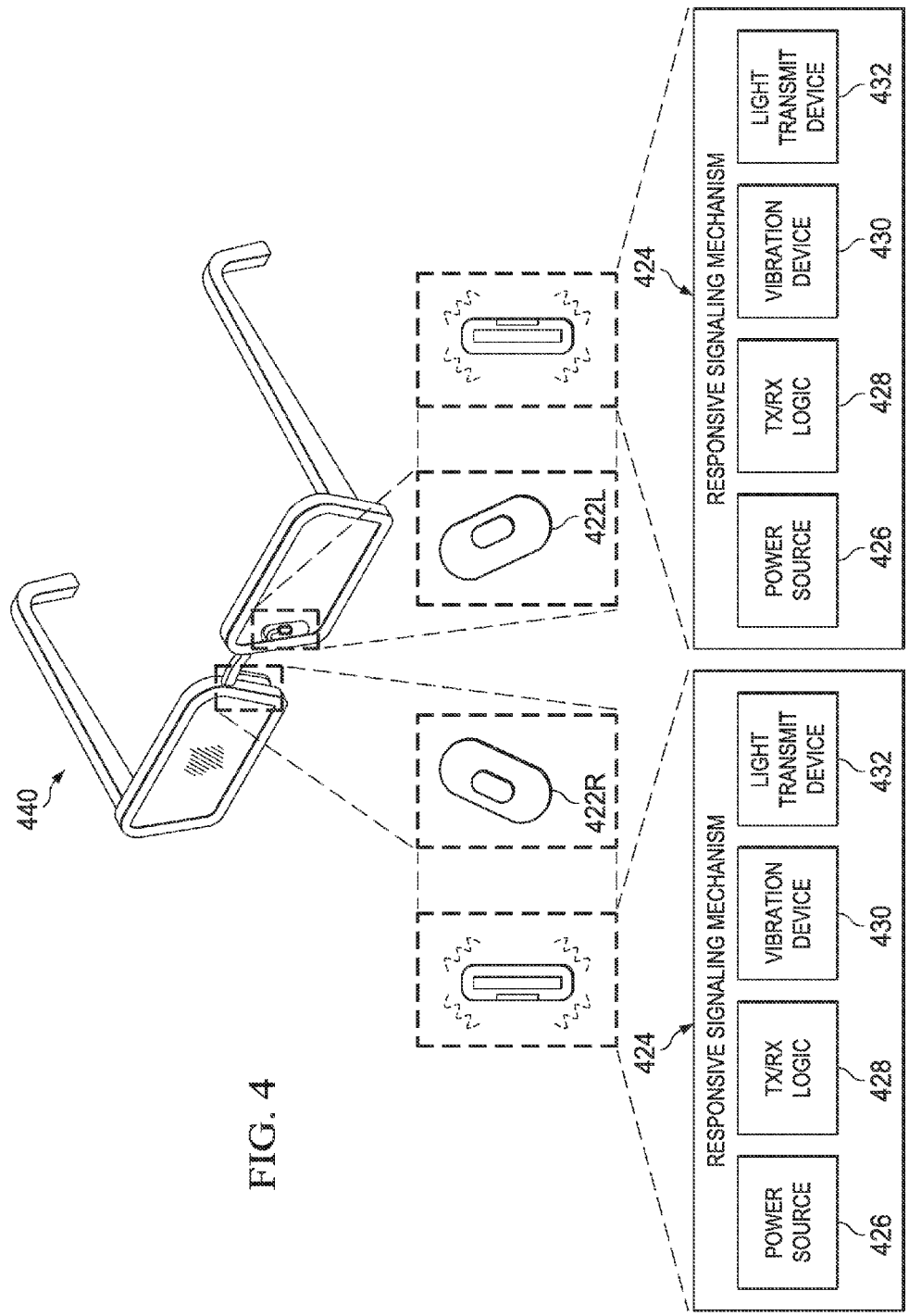
FIG. 4 depicts an exemplary implementation of a set of responsive nose pads comprising the aforementioned responsive signaling mechanism in accordance with an illustrative embodiment.

FIG. 4 depicts an exemplary implementation of a set of responsive nose pads comprising the aforementioned responsive signaling mechanism in accordance with an illustrative embodiment. As is illustrated, eyeglasses 440 comprise right responsive nose pad 422R, which correlates to right responsive nose pad 322R of FIG. 3, and left responsive nose pad 422L, which correlates to left responsive nose pad 322L of FIG. 3. Within right nose pad 422R is responsive signaling mechanism 424 that comprises power source 426, transmit (Tx)/receive (Rx) logic 428, vibration device 430, and light transmit device 432. Likewise, within left nose pad 422L is a similar responsive signaling mechanism 424 that comprises power source 426, Tx/Rx logic 428, vibration device 430, and light transmit device 432. In this illustration, Tx/Rx logic 428 in both right responsive nose pad 422R and left responsive nose pad 422L receives a signal from notification logic within a mobile device via a Bluetooth network, such as Bluetooth network 118 of FIG. 1, that causes both responsive nose pad 422R and left responsive nose pad 422L to vibrate via vibration device 430.

Figure 5:
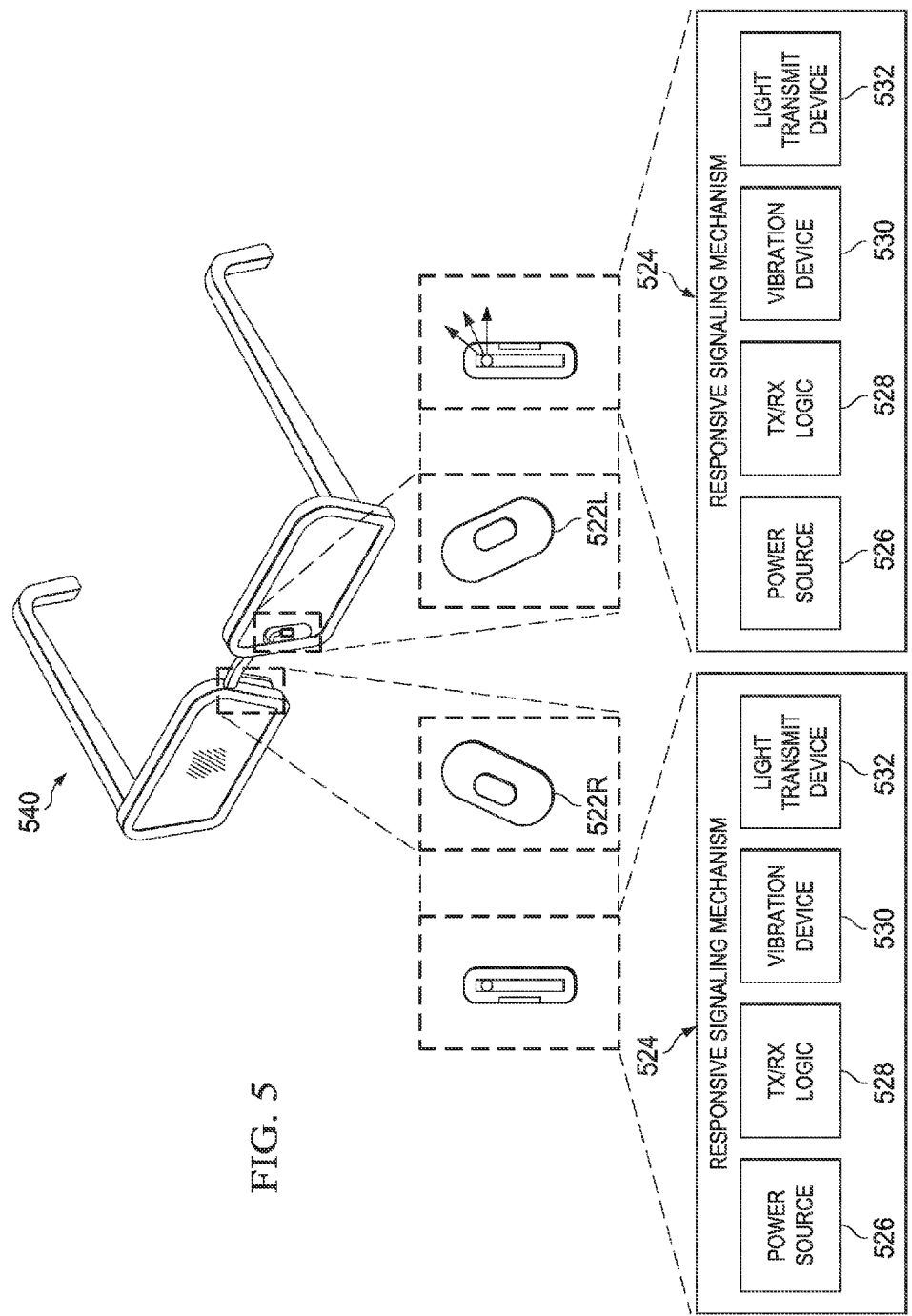
FIG. 5 depicts another exemplary implementation of a set of responsive nose pads comprising the aforementioned responsive signaling mechanism in accordance with an illustrative embodiment.

FIG. 5 depicts another exemplary implementation of a set of responsive nose pads comprising the aforementioned responsive signaling mechanism in accordance with an illustrative embodiment. As is illustrated, eyeglasses 540 comprise right responsive nose pad 522R, which correlates to right responsive nose pad 322R of FIG. 3, and left responsive nose pad 522L, which correlates to left responsive nose pad 322L of FIG. 3. Within right nose pad 522R is responsive signaling mechanism 524 that comprises power source 526, transmit (Tx)/receive (Rx) logic 528, vibration device 530, and light transmit device 532. Likewise, within left nose pad 522L is a similar responsive signaling mechanism 524 that comprises power source 526, Tx/Rx logic 528, vibration device 530, and light transmit device 532. In this illustration, Tx/Rx logic 528 within left responsive nose pad 522L receives a signal from notification logic within a mobile device via a Bluetooth network, such as Bluetooth network 118 of FIG. 1, that causes left responsive nose pad 522L to flash a light pattern into a peripheral portion of the left lens of eyeglasses 540 via light transmit device 532.

Figure 6:
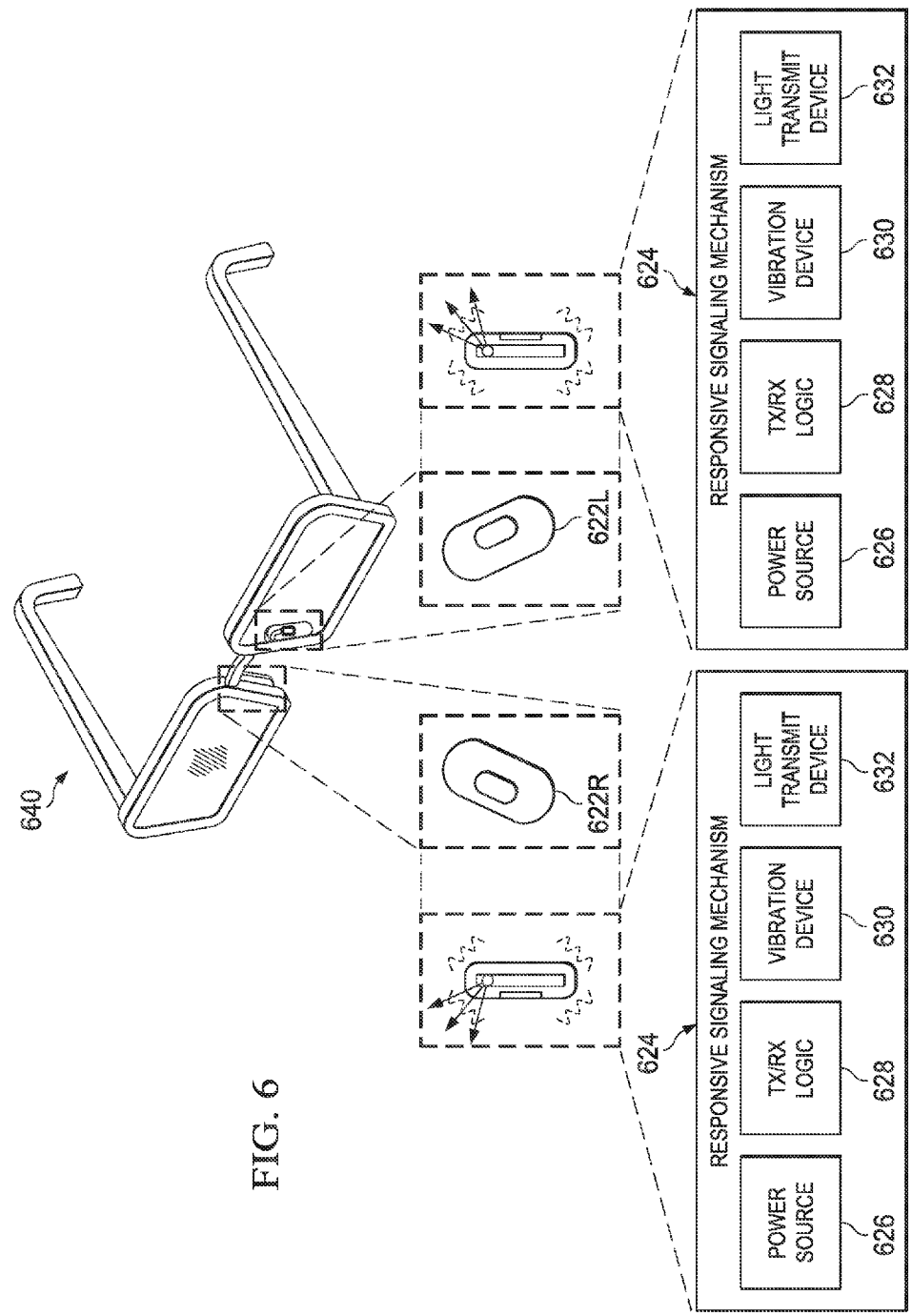
FIG. 6 depicts still another exemplary implementation of a set of responsive nose pads comprising the aforementioned responsive signaling mechanism in accordance with an illustrative embodiment.

FIG. 6 depicts still another exemplary implementation of a set of responsive nose pads comprising the aforementioned responsive signaling mechanism in accordance with an illustrative embodiment. As is illustrated, eyeglasses 640 comprise right responsive nose pad 622R, which correlates to right responsive nose pad 322R of FIG. 3, and left responsive nose pad 622L, which correlates to left responsive nose pad 322L of FIG. 3. Within right nose pad 622R is responsive signaling mechanism 624 that comprises power source 626, transmit (Tx)/receive (Rx) logic 628, vibration device 630, and light transmit device 632. Likewise, within left nose pad 622L is a similar responsive signaling mechanism 624 that comprises power source 626, Tx/Rx logic 628, vibration device 630, and light transmit device 632. In this illustration, Tx/Rx logic 628 within right responsive nose pad 622R and left responsive nose pad 622L receives a signal from notification logic within a mobile device via a Bluetooth network, such as Bluetooth network 118 of FIG. 1, that causes both right responsive nose pad 622R and left responsive nose pad 622L to vibrate via vibration device 630 as well as flash a light pattern into a peripheral portion of the left lens of eyeglasses 640 via light transmit device 632.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
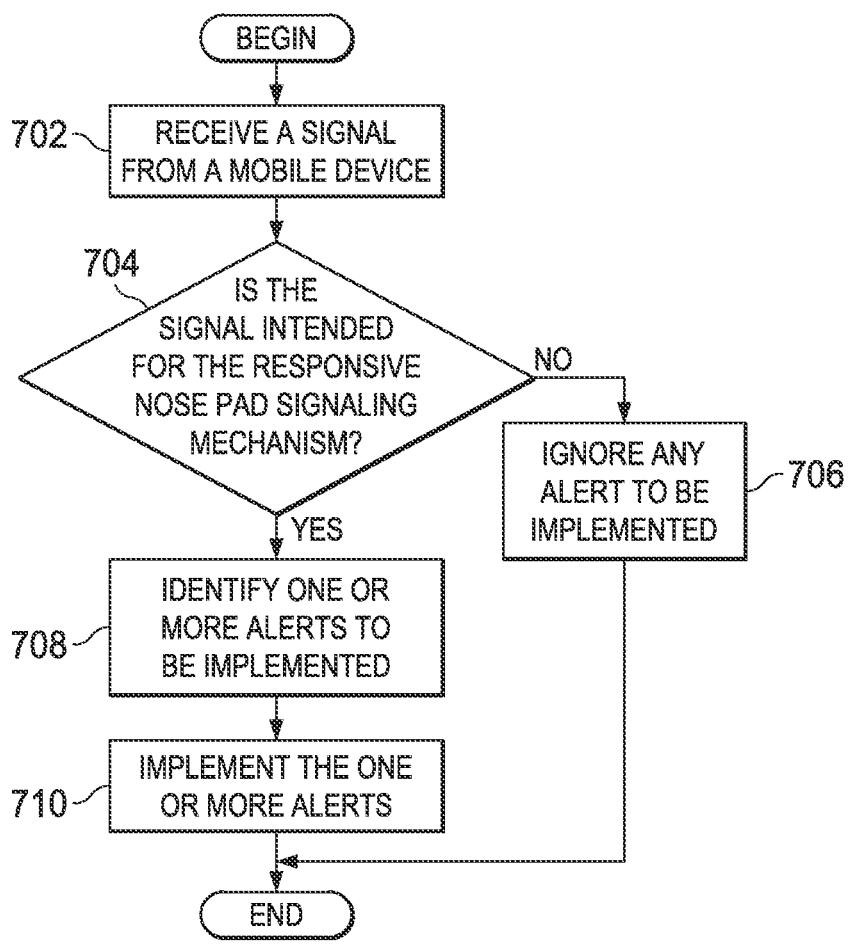
FIG. 7 depicts a flowchart of the operation performed by a responsive nose pad signaling mechanism associated with a set of eyeglasses in accordance with an illustrative embodiment.

FIG. 7 depicts a flowchart of the operation performed by a responsive nose pad signaling mechanism associated with a set of eyeglasses in accordance with an illustrative embodiment. As the operation begins, a responsive nose pad signaling mechanism receives a signal from a mobile device (step 702). The responsive nose pad signaling mechanism determines whether the signal is intended for the responsive nose pad signaling mechanism (step 704). If at step 704 the signal is not intended for the responsive nose pad signaling mechanism, the responsive nose pad signaling mechanism ignores the signal (step 706), with the operation terminating thereafter. If at step 704 the signal is intended for the responsive nose pad signaling mechanism, the responsive nose pad signaling mechanism identifies one or more alerts to be implemented by the responsive nose pad signaling mechanism (step 708). The responsive nose pad signaling mechanism then implements the one or more alerts (step 710). The one or more alerts includes vibrating the nose pad via a vibration device or transmitting a light into a peripheral area of an associated lens of the set of eyeglasses with which the responsive nose pad signaling mechanism is associated. The operation ends thereafter.

Figure 8:
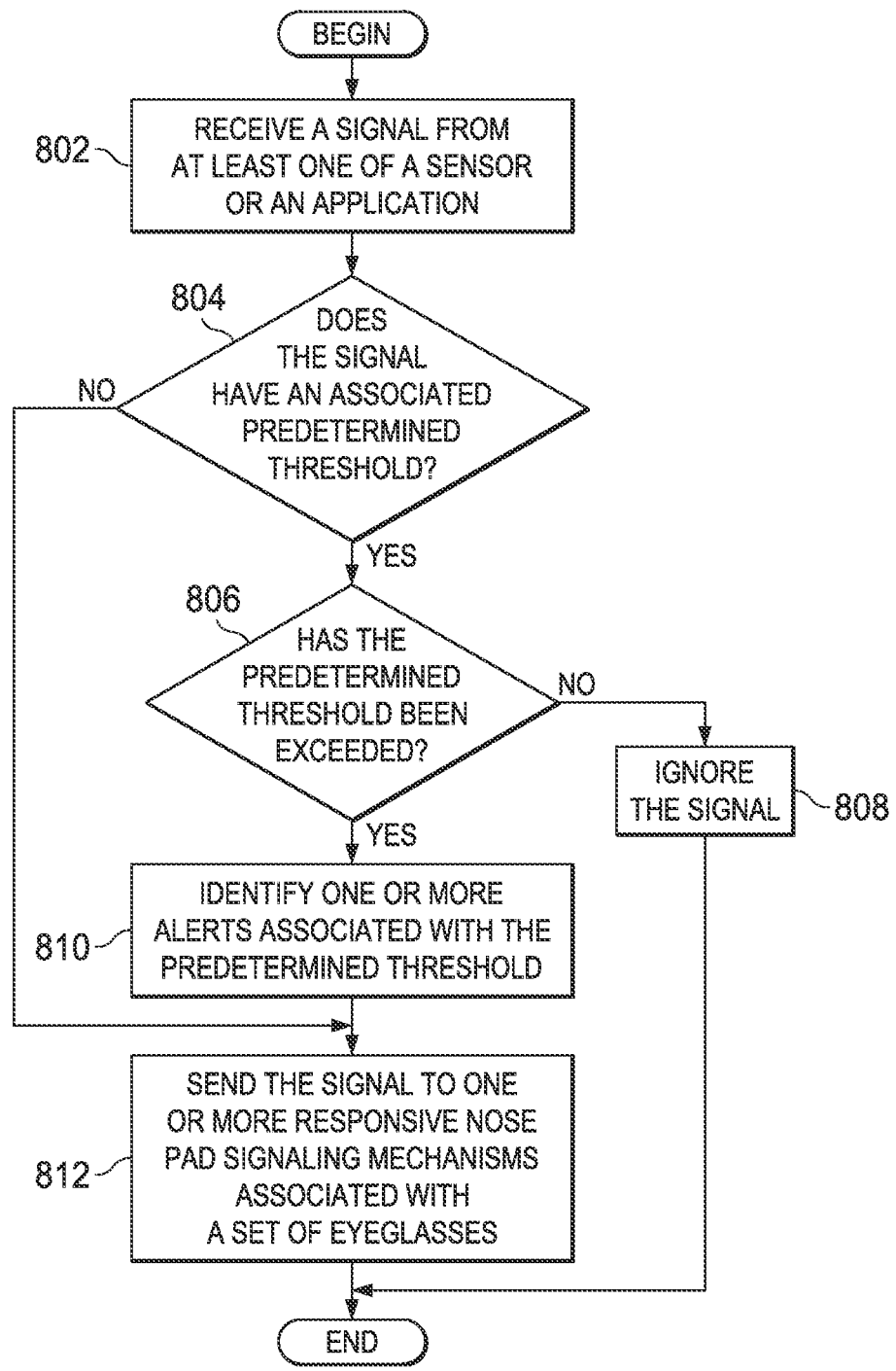
FIG. 8 depicts a flowchart of the operation performed by a mobile device associated with a responsive nose pad signaling mechanism of a set of eyeglasses in accordance with an illustrative embodiment.

FIG. 8 depicts a flowchart of the operation performed by a mobile device associated with a responsive nose pad signaling mechanism of a set of eyeglasses in accordance with an illustrative embodiment. As the operation begins, the mobile device receives a signal from at least one of a sensor or an application (step 802). The mobile device determines whether the signal has an associated predetermined threshold (step 804). If at step 804 the signal has an associated predetermined threshold, then the mobile device determines whether the value associated with the signal exceeds the associated predetermined threshold (step 806). If at step 806 the value of the signal fails to exceed the predetermined threshold, then the mobile device ignores the signal (step 808), with the operations terminating thereafter. If at step 806 the value of the signal exceeds the predetermined threshold, then the mobile device identifies one or more alerts associated with the predetermined threshold (step 810). From step 810 or if at step 804 the signal fails to have an associated predetermined threshold, the mobile device sends the signal to one or more responsive nose pad signaling mechanisms associated with a set of eyeglasses (step 812), with the operation terminating thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for alerting a user to an incoming call, text message, or email, as well as provide other cues from a mobile device to a user through responsive nose pads on a set of eyeglasses that the user is wearing. The cues may include vibration alerts, visual alerts, or the like, to notify the user of, for example, an incoming call, text message, or email, directions to their location, health alerts, or the like. These cues may cause either the right nose pad or left nose pad to vibrate on the user's nose or flash a light onto the lens of the eyeglasses that reflects toward the user such that the light is detectable by the user informing the user to turn right or left. Thus, the responsive nose pads of the illustrative embodiments provide a symmetrically placed (left-right) output device for users. When a user wears eyeglasses equipped with the responsive nose pads, the user may be notified of incoming calls, text messages, emails, or other alerts that may otherwise be missed when the user is otherwise unable to hear a ringtone or feel a vibrating alert.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a set of responsive nose pad mechanisms each comprising a processor and a memory coupled to the processor, for notifying a user of an alert using one or more responsive nose pads coupled to a set of eyeglasses the user is wearing, the method comprising:
by each of the set of responsive nose pad mechanisms:
responsive to receiving a signal from a mobile device, determining, by the responsive nose pad mechanism, whether the signal is intended for the responsive nose pad signaling mechanism;
responsive to the signal being intended for the responsive nose pad signaling mechanism, identifying, by the responsive nose pad signaling mechanism, one or more alerts to be implemented; and
implementing, by the responsive nose pad mechanism, the one or more alerts such that the alert is generated by one or more devices within the associated responsive nose pad.

2. The method of claim 1, further comprising:
responsive to the signal failing to be intended for the responsive nose pad signaling mechanism, ignoring, by the responsive nose pad mechanism, any alert that is to be implemented.

3. The method of claim 1, wherein the one or more alerts is a vibration of the associated responsive nose pad via a vibration device in the responsive nose pad mechanism of the associated responsive nose pad.

4. The method of claim 1, wherein the one or more alerts is emitting a light into the peripheral area of an associated lens of the set of eyeglasses of the associated responsive nose pad via a light transmit device in the responsive nose pad mechanism of the associated responsive nose pad.

5. The method of claim 1, wherein the one or more alerts are a vibration of the associated responsive nose pad via a vibration device in the responsive nose pad mechanism of the associated responsive nose pad and emitting a light into the peripheral area of an associated lens of the set of eyeglasses of the associated responsive nose pad via a light transmit device in the responsive nose pad mechanism of the associated responsive nose pad.

6. The method of claim 1, wherein the signal originates from the mobile device responsive to an application providing directions to a location from which the directions inform the user to turn right or left by an alert to an associated one of the one or more responsive nose pads.

7. The method of claim 1, wherein the signal originates from the mobile device responsive to a predetermined threshold being exceeded indicated by a value from one or more sensors.

8. The method of claim 1, wherein the one or more sensors are at least one of an internal sensor of the mobile device, an external sensor of the mobile device, or an external sensor of the one or more responsive nose pads.

9. A computer program product comprising a computer readable storage medium having a computer readable program stored therein, wherein the computer readable program, when executed on a set of responsive nose pad mechanisms for notifying a user of an alert using one or more responsive nose pads coupled to a set of eyeglasses the user is wearing, causes each of the set of responsive nose pad mechanisms to:
responsive to receiving a signal from a mobile device, determine whether the signal is intended for the responsive nose pad signaling mechanism;
responsive to the signal being intended for the responsive nose pad signaling mechanism, identify one or more alerts to be implemented; and
implement the one or more alerts such that the alert is generated by one or more devices within the associated responsive nose pad.

10. The computer program product of claim 9, wherein the computer readable program further causes each of the set of responsive nose pad mechanisms to:
responsive to the signal failing to be intended for the responsive nose pad signaling mechanism, ignore any alert that is to be implemented.

11. The computer program product of claim 9, wherein the one or more alerts is a vibration of the associated responsive nose pad via a vibration device in the responsive nose pad mechanism of the associated responsive nose pad.

12. The computer program product of claim 9, wherein the one or more alerts is emitting a light into the peripheral area of an associated lens of the set of eyeglasses of the associated responsive nose pad via a light transmit device in the responsive nose pad mechanism of the associated responsive nose pad.

13. The computer program product of claim 9, wherein the one or more alerts are a vibration of the associated responsive nose pad via a vibration device in the responsive nose pad mechanism of the associated responsive nose pad and emitting a light into the peripheral area of an associated lens of the set of eyeglasses of the associated responsive nose pad via a light transmit device in the responsive nose pad mechanism of the associated responsive nose pad.

14. The computer program product of claim 9, wherein:
   the signal originates from the mobile device responsive to an application providing directions to a location from which the directions inform the user to turn right or left by an alert to an associated one of the one or more responsive nose pads; or
   the signal originates from the mobile device responsive to a predetermined threshold being exceeded indicated by a value from one or more sensors.

15. A set of responsive nose pad mechanisms for notifying a user of an alert using one or more responsive nose pads coupled to a set of eyeglasses the user is wearing, each comprising:
   a processor; and
   a memory coupled to the processor, wherein the memory comprises instructions which, when executed by the processor, cause the processor to:
   responsive to receiving a signal from a mobile device, determine whether the signal is intended for the responsive nose pad signaling mechanism;
   responsive to the signal being intended for the responsive nose pad signaling mechanism, identify one or more alerts to be implemented; and
   implement the one or more alerts such that the alert is generated by one or more devices within the associated responsive nose pad.

16. The set of responsive nose pad mechanisms of claim 15, wherein the instructions further cause each of the set of responsive nose pad mechanisms to:
   responsive to the signal failing to be intended for the responsive nose pad signaling mechanism, ignore any alert that is to be implemented.

17. The set of responsive nose pad mechanisms of claim 15, wherein the one or more alerts is a vibration of the associated responsive nose pad via a vibration device in the responsive nose pad mechanism of the associated responsive nose pad.

18. The set of responsive nose pad mechanisms of claim 15, wherein the one or more alerts is emitting a light into the peripheral area of an associated lens of the set of eyeglasses of the associated responsive nose pad via a light transmit device in the responsive nose pad mechanism of the associated responsive nose pad.

19. The set of responsive nose pad mechanisms of claim 15, wherein the one or more alerts are a vibration of the associated responsive nose pad via a vibration device in the responsive nose pad mechanism of the associated responsive nose pad and emitting a light into the peripheral area of an associated lens of the set of eyeglasses of the associated responsive nose pad via a light transmit device in the responsive nose pad mechanism of the associated responsive nose pad.

20. The set of responsive nose pad mechanisms of claim 15, wherein:
   the signal originates from the mobile device responsive to an application providing directions to a location from which the directions inform the user to turn right or left by an alert to an associated one of the one or more responsive nose pads; or
   the signal originates from the mobile device responsive to a predetermined threshold being exceeded indicated by a value from one or more sensors.

\* \* \* \* \*